(12) United States Patent
Hay et al.

(10) Patent No.: US 9,703,676 B2
(45) Date of Patent: Jul. 11, 2017

(54) TESTING APPLICATION INTERNAL MODULES WITH INSTRUMENTATION

(71) Applicant: International Business Machines Corporation, Armonk, NY (US)

(72) Inventors: Roee Hay, Haifa (IN); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/587,834

(22) Filed: Dec. 31, 2014

(65) Prior Publication Data
US 2016/0188443 A1 Jun. 30, 2016

(51) Int. Cl.
G06F 9/44 (2006.01)
G06F 11/36 (2006.01)

(52) U.S. Cl.
CPC .................. *G06F 11/3644* (2013.01)

(58) Field of Classification Search
None
See application file for complete search history.

(56) References Cited

U.S. PATENT DOCUMENTS

| | | | | |
|---|---|---|---|---|
| 8,843,899 B2 * | 9/2014 | Bates | ................. | G06F 11/3624 717/124 |
| 9,015,676 B2 * | 4/2015 | Bates | ................. | G06F 11/362 717/127 |
| 2003/0004671 A1 * | 1/2003 | Minematsu | ........... | G06F 11/362 702/123 |
| 2011/0126288 A1 | 5/2011 | Schloegel et al. | | |
| 2011/0289301 A1 * | 11/2011 | Allen | ................. | G06F 11/3636 712/227 |

OTHER PUBLICATIONS

Disclosed Anonymously., "A Method for Dynamically Testing an Application in a Mobile Device for Vulnerabilities by Creating a Model of the Application during Testing", Anonymous, IP.com, IPCOM000232429D, Nov. 7, 2013, 4 pages.
Jesse Burns., "Exploratory Android™ Surgery Android", Black Hat USA 2009, can be found at: http://www.blackhat.com/presentations/bh-usa-09/BURNS/BHUSA09-Burns-AndroidSurgery-SLIDES.pdf, 47 pages.
Long Lu et al., "CHEX: Statically Vetting Android Apps for Component Hijacking Vulnerabilities", ACM, CCS '12, Proceedings of the 2012 ACM conference on Computer and communications security, Oct. 2012, 12 pages.
Tutorial., "Activity Testing Tutorial", 2013, can be found at: http://developer.android.com/tools/testing/activity_test.html, 14 pages.

* cited by examiner

*Primary Examiner* — Evral E Bodden
(74) *Attorney, Agent, or Firm* — Cantor Colburn LLP; Ed Choi

(57) ABSTRACT

Testing internal modules of application code includes applying, via a computer processor, instrumentation hooks to internal module interface points and external module interface points of the application code, executing the application code and recording values received at the instrumented interface points, determining an accessible internal module input point and a constraint based on the recorded values from the instrumented external module interface points, and testing the accessible internal module input point based on the constraint.

18 Claims, 5 Drawing Sheets

300

TESTING APPLICATION INTERNAL MODULES WITH INSTRUMENTATION

BACKGROUND

The present disclosure relates to testing applications, and more specifically, to testing applications using instrumentation.

Applications in modern electronic devices, such as mobile devices, may have internal modules that can interact with external modules, such as user interfaces. An internal module refers to a module of an application that is accessed via another module in the application. For example, an internal module may correspond to private activities in a mobile application or mobile platform that do not include user interaction. An internal module can be accessed by another internal module or an external module via inter-process communication (IPC) channels at interface points. An external module refers to a module in an application that can be accessed by an end user or another application, among others. Developers generally test internal modules by developing customized tests for testing internal modules. However, customized testing can be error prone and may also leave potential security threats untested.

SUMMARY

According to an embodiment described herein, a system includes a memory having computer readable instructions, and a processor for executing the computer readable instructions. The computer readable instructions include receiving application code and instrumenting the application code by inserting instrumentation hooks at internal module input points, external module input points, and external module release points of the application code. The computer readable instructions also include mapping data flow between the external module release points and the internal module input points of the application code via the instrumentation hooks. The computer readable instructions further include determining at least one of the internal module input points is accessible via at least one of the external module release points. The computer readable instructions also include testing the accessible internal module input point by sending a test value based on a constraint to the internal module input point.

According to another embodiment described herein, a method includes applying, via a processor, instrumentation hooks to internal module interface points and external module interface points of application code. The method also includes executing, via the processor, the application code and recording values received at the instrumented interface points. The method further includes determining, via the processor, an accessible internal module input point and a constraint based on the recorded values from the instrumented external module interface points. The method also includes testing, via the processor, the accessible internal input point based on the constraint.

According to another embodiment described herein, a computer program product for testing an application includes a computer-readable storage medium having program code embodied therewith, wherein the computer readable storage medium is not a transitory signal per se. The program code is executable by a processor to cause the processor to apply instrumentation hooks to an application code at internal module input points, external module input points, and external module release points. The program code also causes the processor to execute the application and record values received at the instrumented points. The program code further causes the processor to determine an accessible internal module input point and a constraint based on an associated external module. The program code also causes the processor to test the accessible internal module input point based on the constraint.

DETAILED DESCRIPTION

According to an embodiment, accessible internal modules of an application are tested by a testing module using instrumentation. An accessible internal module, as used herein, refers to a module that is accessible by at least one external module. In some embodiments, interface points of modules within an application code can be instrumented. Instrumentation is code that can be used to monitor the operation of an application. In one embodiment, the application may be a mobile application. An interface point, as used herein, includes input points and release points within internal modules and external modules. An input point refers to an interface point that receives input data. A release point refers to an interface point that sends data to another module. For example, a release point can send data via IPC channels to other modules of an application. The instrumentation can be used to determine which internal modules of the application are accessible via one or more external modules. The application can then be analyzed dynamically by executing the application and recording values at the instrumented interface points of internal and external modules. Dynamic analysis refers to the evaluation of the program during runtime. In some examples, the recorded values are used to determine accessible internal input points and constraints for the accessible internal input points based on values detected at corresponding external module input points. The accessible internal input points can then be tested using the determined constraints. Thus, in accordance with embodiments described herein, internal modules of an application can be tested without complex analysis to drive execution when testing internal modules through external modules of the application. Additionally, testing the internal modules is precise and the results of testing do not contain false positives. All accessible internal modules are also effectively tested; therefore, potential security risks are not left untested. Moreover, because the testing is targeted to input points of accessible internal modules, the testing is efficient.

Figure 1:
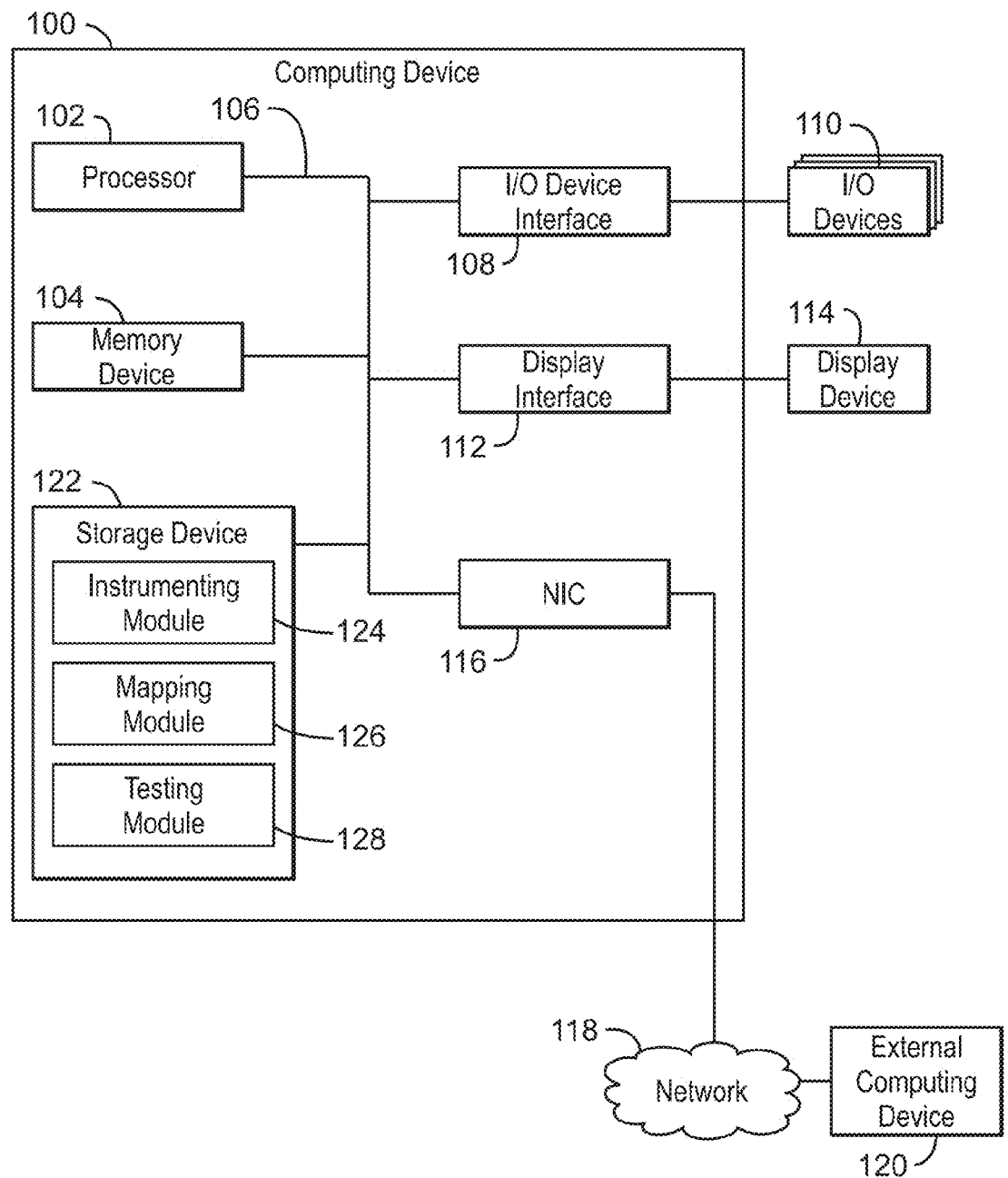
FIG. 1 is block diagram of a computing device for testing internal modules in accordance with an embodiment.

With reference now to FIG. 1, an example computing device can test internal modules. The computing device 100 may be, for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include an instrumenting module 124, a mapping module 126, and a testing module 128. The instrumenting module 124 can receive an application code and apply instrumentation to internal and external module interface points. In some examples, the instrumenting module 124 automatically instruments the interface points upon receiving the code of the application. For example, the interface points can be inter-process communication (IPC) points for communication between modules. In some examples, the instrumentation includes instrumentation hooks. An instrumentation hook, as used herein, refers to a piece of code that can be inserted into a module interface point that can capture data entering or leaving the interface point. For example, an instrumentation hook can be a value logger that can record a value received at a specific interface point of a module. An interface point can be an input point for receiving a value or a release point for sending a value to another module or operating system, among others.

In some examples, the instrumenting module 124 can execute the application. The mapping module 126 can record values received at the instrumented interface points and map control and data flow between external module release points and internal module input points. For example, an external module release point may send a value to an internal module input point during execution of the application. In some examples, an instrumentation hook in an external module release point and an instrumentation hook in an internal module input point record the same value. The mapping module 126 can match the values and determine that the external module release point is associated with the internal module input point. In some examples, the mapping module 126 can map external module release points to internal module input points by matching recorded values. In some examples, the mapping module 126 can also determine accessible internal input points by identifying internal module input points that are accessible via one or more external modules. In some examples, the mapping module 126 can further determine constraints on accessible internal module input point values. For example, the mapping module 126 can analyze recorded values from an input point and release point of an external module that is associated with an accessible internal module. The mapping module 126 can determine the difference between the recorded values at the release point and input point of the associated external module and use the difference as a constraint on the input of the corresponding accessible internal module. A constraint is a limitation on a domain of possible values to be received by an accessible internal module. Because certain values can never be received by a particular accessible internal module, such values can be excluded when testing the module. Therefore, constraints can be used to make testing efficient by reducing the number of values to be tested.

Still referring to FIG. 1, in some examples, the testing module 128 uses the constraint to test one or more internal module input points. For example, a test value based on the constraint can be sent to an accessible internal module input point. In some examples, the testing module 128 determines if the internal module input point is vulnerable. For example, the internal module input point may function in an unintended manner after receiving a test value. The testing module 128 can identify vulnerable internal module input points based on the results of the test. For example, inputs likely to be used in cross-application scripting and SQL injection attacks can be tested. The testing module 128 can also test for input values that may result in an application sending sensitive data, such as personal user information or device hardware identifiers, to an unauthorized user, computing device, or application, among others.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the instrumenting module 124, mapping module 126, and testing module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the instrumenting module 124, mapping module 126, and testing module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
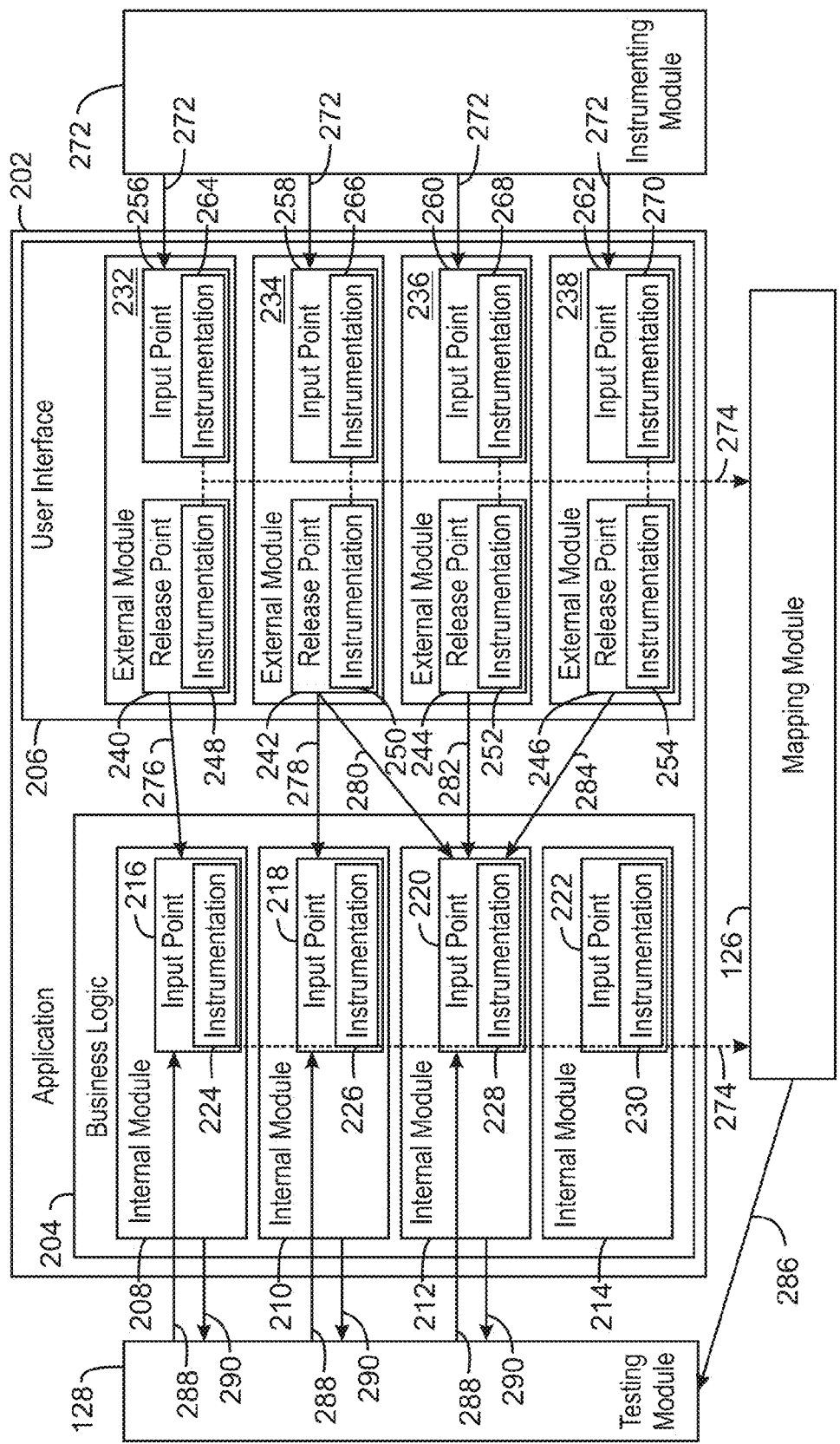
FIG. 2 is a block diagram of a system for testing internal modules of an application in accordance with an embodiment.

FIG. 2 is a block diagram of an example system for testing internal modules of an application in accordance with an embodiment. The example system of FIG. 2 is generally referred to by the reference number 200.

In FIG. 2, the system 200 includes an instrumenting module 124, a mapping module 126, a testing module 128, and an application 202. The application includes business logic 204 and a user interface 206. The business logic 204 includes internal modules 208, 210, 212, 214 with corresponding input points 216, 218, 220, and 222. The input points 216, 218, 220, and 220, contain instrumentation hooks 224, 226, 228, and 230, respectively. The user interface 206 includes external modules 232, 234, 236 and 238. The external modules 232, 234, 236 and 238, include release points 240, 242, 244, and 246, respectively. The release points 240, 242, 244, and 246, contain instrumentation hooks 248, 250, 252, and 254, respectively. The external modules 232, 234, 236, and 238, also include input points 256. 258, 260 and 262, respectively. The input points 256, 258, 260, and 262, also include instrumentation hooks 264, 266, 268 and 270, respectively.

As shown in FIG. 2, the instrumenting module 124 has embedded instrumentation hooks 224, 226, 228, and 230 into the internal modules 208, 210, 212, and 214. For example, the instrumentation hooks can be data loggers that record data values arising at a particular input or release point of an internal or external module. The instrumenting module 124 also has embedded instrumentation hooks 248, 250, 252, and 254, into the release points 240, 242, 244, 246 of the external modules 232, 234, 236, and 238. The instrumenting module 124 has also embedded instrumentation hooks 264, 266, 268 and 270 into the input points 256, 258, 260 and 262 of the external modules 232, 234, 236, and 238. In some embodiments, the instrumenting module 124 automatically embeds the instrumentation hooks upon receiving the code of application 202. For example, the instrumenting module 124 can analyze the code for interface points and embed instrumentation hooks into each interface point.

Still referring to FIG. 2, the instrumenting module 124 can execute the application 202 as indicated by arrows 272. For example, the instrumenting module 124 can analyze the application 202 dynamically by running the application in an emulator or a simulator. During execution, external modules may interact with one or more internal modules. For example, in response to an execution 272 of the application 202, external module 232 can send a value via release point 240 to input point 216 of internal module 208. Instrumentation hooks 264, 248, and 224 can record values received at the external module 232 input point 256, the external module 232 release point 240 and the internal module 208 input point 216 during the execution. The mapping module 126 can receive the values from the instrumentation hooks via data path 274. The mapping module 126 can then process the received data values and map the external modules 232, 234, 236, and 238 to the internal modules 208, 210, and 212, as shown by arrows 276, 278, 280, 282, and 284. The mapping module 126 can determine that some of the internal modules are internal modules that are accessible to one or more external modules. For example, internal module 208 is accessible to external module 232, internal module 210 is accessible to external module 234, and internal module 212 is accessible to external modules 234, 236 and 238. The mapping module 126 can therefore identify internal modules 208, 210 and 212 as accessible internal modules. Additionally, the mapping module 126 can calculate constraints on input values for the accessible internal modules by analyzing data values at the input point and release point of each associated external module. For example, the constraints for input point 216 can be calculated by analyzing the input point values by instrumentation hook 264 of input point 256 and the output values received by instrumentation hook 248 of release point 240 of associated module 232. Likewise, the mapping module 126 can calculate the constraints for input point 220 of internal module 212 by analyzing input values at instrumentation hook 266 of input point 258 and output values recorded at instrumentation hook 250 of release point 242 of external module 234, the input values at instrumentation hook 268 and output values at instrumentation hook 252 of external module 236, and the input values recorded by instrumentation hook 270 and output values recorded by instrumentation hook 254 of external module 238. By analyzing how an input value of an associated external module is transformed into an output value at the release point of an associated external module, the mapping module 126 can calculate the range of possible values to be sent to the input points of the accessible internal modules.

Still referring to FIG. 2, the mapping module 126 can send a map of the accessible internal modules and their associated external modules and constraints to the testing module 128 as indicated by an arrow 286. The testing module 128 can then send test values as indicated by arrows 288 based on the received constraints calculated by the mapping module 126 for each accessible internal module. For example, the constraints can be limits on potential test values that are calculated by analyzing received values at release points of associated external modules against the values received at input points of the associated external modules. The internal modules 208, 210, 212 can then return values to be analyzed by the testing module 128 as indicated by arrows 290. The testing module 128 can determine if an input point for an internal module includes a vulnerability or an error by checking the values flowing into security-sensitive operations via instrumentation. In some examples, the testing module 128 can determine that an input point has a vulnerability by monitoring external interfaces. For example, the testing module 128 can monitor HTTP messages sent by the app or data submitted to a backend database.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional interfaces, or additional modules, etc.).

Figure 3:
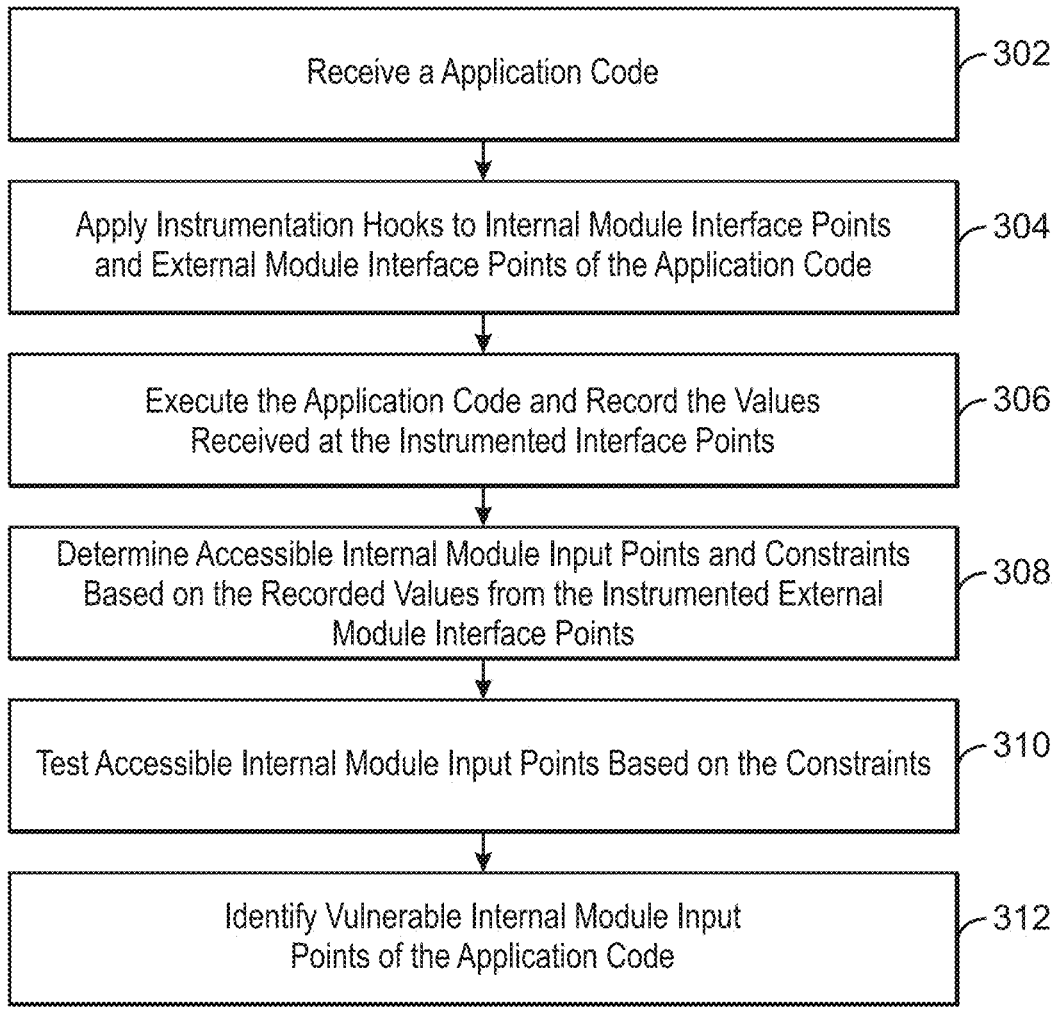
FIG. 3 is a process flow diagram of a method for testing internal input points in internal modules in accordance with an embodiment.

FIG. 3 is a process flow diagram of an example method that can test internal input points in internal modules. The method 300 can be implemented with any suitable computing device, such as the computing device 100 of FIG. 1 and is described with reference to the system 200 of FIG. 2.

At block 302, the instrumenting module 124 receives application code 202. For example, the application can be a mobile application, mobile game, and the like.

At block 304, the instrumenting module 124 applies instrumentation hooks to internal module interface points and external module interface points of the application code 202. As discussed above, applying an instrumentation hook to a module can include inserting a value logger into a module at a point of execution of the module. For example, the instrumenting module 124 can instrument input points 216, 218, 220, and 222 of internal modules 208, 210, 212, and 214 respectively. The instrumenting module 124 can also instrument release points 240, 242, 244, and 246 and input points 256, 258, 260, and 262, of external modules 232, 234, 236 and 238, respectively.

At block 306, the mapping module 126 executes the application code 202 and records the values received at the instrumented module interface points. For example, an emulator or a simulator can be used to dynamically analyze the instrumented application 202. In some examples, the values recorded during execution of application 202 can be sent via a data path 274 to mapping module 126.

At block 308, the mapping module 126 determines accessible internal module input points and constraints based on the recorded values from the instrumented external module interface points. For example, the mapping module 126 can determine internal modules 208, 210, and 212 to be internal modules that are accessible to an external module and therefore input points 216, 218, and 220, to be accessible internal module input points. An internal module can be determined to be an accessible internal module if its input point is mapped to a release point of one or more external modules. In some examples, the mapping module 126 can determine constraints based on differences between values received by instrumentation hooks at input points and release points of external modules 232, 234, 236, and 238. For example, a value recorded by the instrumentation hook 264 of input point 256 may be truncated such that only three significant digits of the recorded value of the instrumentation hook 264 are recorded by the instrumentation hook 248 of release point 240 of external module 232. Therefore, in some examples, a constraint on input point 216 of internal module 208 can be a three digit constraint. For example, a constraint can include any suitable data modification to data received from a user, application, or operating system at an input point of an external module that is associated with an internal module.

At block 310, the testing module 128 tests accessible internal module input points based on the constraints. For example, the testing module 128 can send values constrained to three significant digits to input point 216 of internal module 208 for testing. In some examples, the testing module 128 can send test values based on multiple constraints. For example, the testing module 128 can send test values to internal module 212 based on constraints determined from external modules 234, 236 and 238.

At block 312, the testing module 128 identifies vulnerable internal module input points of the application code. For example, an internal module 208 can return a value indicating that the test value caused the internal module 208 to function improperly or could be used to perform cross-application scripting attacks or SQL injection attacks and the like. In some examples, the internal module 208 may return a value indicating that a data leakage has occurred, such as personal information or device hardware identification being shared.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
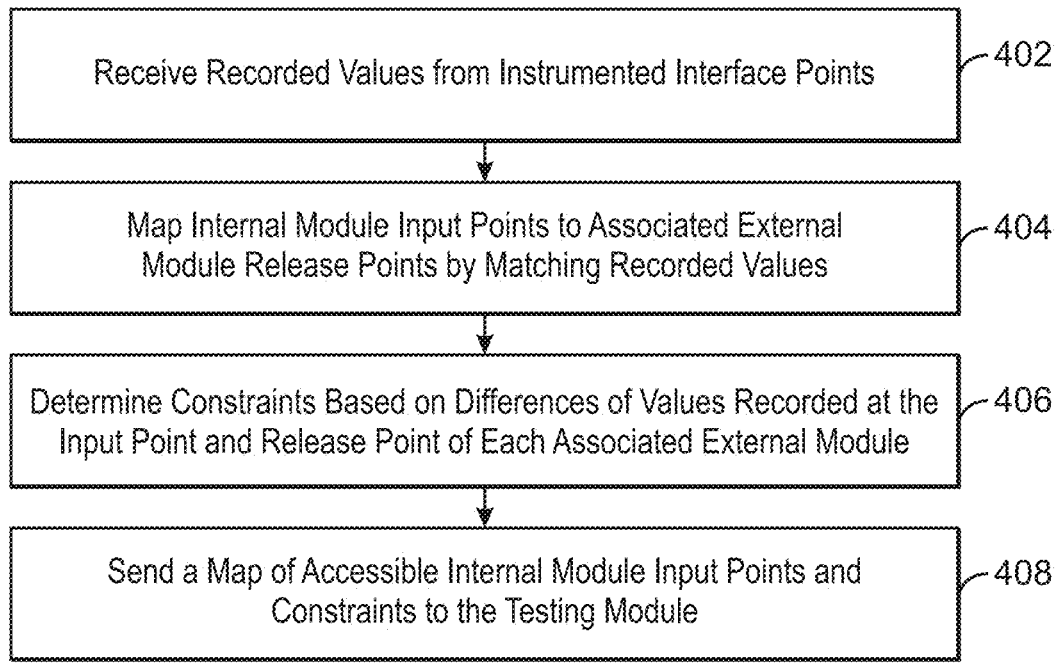
FIG. 4 is a process flow diagram of a method for determining internal input points and constraints for internal modules for testing in accordance with an embodiment.

FIG. 4 is a process flow diagram of an example method that can determine externally accessible internal input points and constraints for internal modules for testing. The method 400 can be implemented with any suitable computing device, such as the computing device 100 of FIG. 1 and is described with reference to the system 200 of FIG. 2.

At block 402, the mapping module 126 receives recorded values from instrumented interface points. For example, the instrumented interface points can be input points of internal modules, and input and release points of external modules.

At block 404, the mapping module 126 maps internal module input points to associated external module release points by matching recorded values. For example, a value recorded by an instrumentation hook 248 of a release point 240 of an external module 232 can match to a value recorded by an instrumentation hook 224 of an input point 216 of an internal module 208. In some examples, the mapping module 126 can map the external module 232 to internal module 208.

At block 406, the mapping module 126 determines constraints based on differences of values recorded at the input point and release point of each associated external module. For example, the mapping module 126 can determine a constraint based on a difference between values received at an instrumentation hook 264 and an instrumentation hook 248 of an external module 232. In some examples, the mapping module 126 can determine a plurality of constraints for a plurality of associated external modules. For example, the mapping module 126 can determine constraints for external modules 234, 236, and 238 associated with internal module 212. The mapping module 126 can calculate the constraints as differences between values recorded by instrumentation hooks at input points and release points of the associated external modules.

At block 408, the mapping module 126 sends a map of accessible internal module input points and constraints to the testing module. For example, the mapping module 126 can send internal module input points 216, 218, and 220, along with constraints calculated from associated external modules 232, 234, 236 and 238.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The embodiments may be implemented by a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
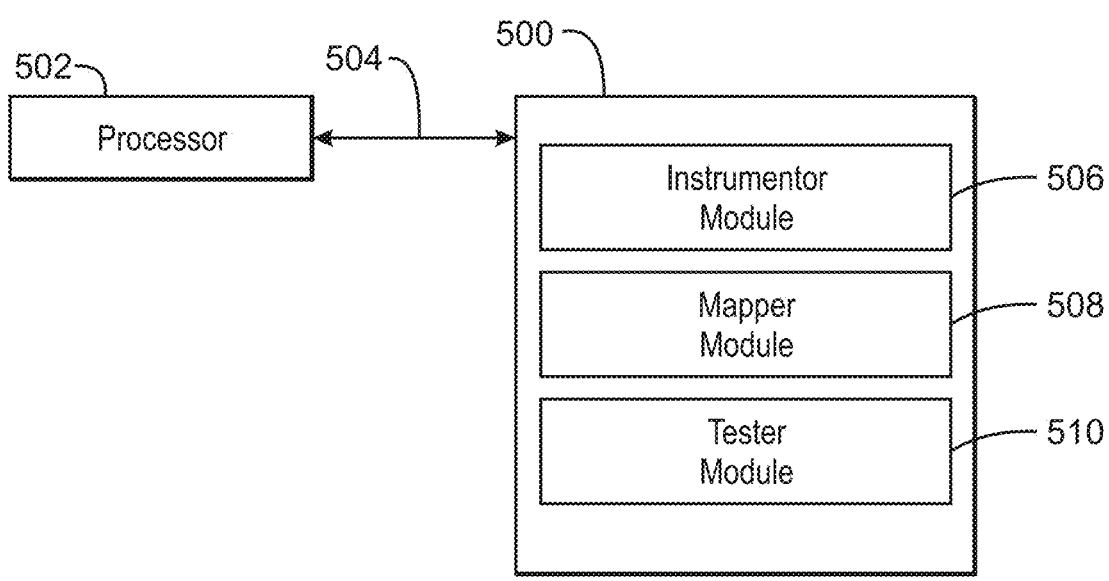
FIG. 5 is a tangible, non-transitory computer-readable medium for testing internal input points of applications in accordance with an embodiment.

Referring now to FIG. 5, a block diagram is depicted of an example tangible, non-transitory computer-readable medium 500 that can test internal input points of applications. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an instrumentor module 506 includes code to apply, via a processor, instrumentation hooks to an application at internal module input points, external module input points, and external module release points. A mapper module 508 includes code to execute, via the processor, the application and record values received at the instrumented points. The mapper module 508 includes code to determine, via the processor, an internal module input point and a constraint based on an associated external module. In some examples, the constraint can include a difference between a value detected by the instrumentation hook at an external module input point and the instrumentation hook at an external module release point. A tester module 510 includes code to test, via the processor, the internal module input point based on the constraint.

In some examples, the instrumentor module 506 can include code executable by the processor to cause the processor to automatically instrument the application code. In some examples, the mapper module 508 can include code to map an external module release point to an internal module input point. In some examples, the tester module 510 can include code to test the accessible internal input point by sending the accessible internal input point a value based on the constraint. In some examples, the tester module 510 can also include code to identify a vulnerable internal entry point of the business logic.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 5 may be included within the tangible, non-transitory, computer-readable medium 500, depending on the specific application.

Technical effects provide for testing of internal modules of an application using instrumentation. The techniques enable testing of the internal modules without complex analysis to drive execution when testing internal modules through external modules of the application. Additionally, the techniques provide for testing of the internal modules that is precise and the results do not contain false positives. As all accessible internal modules are also effectively tested, potential security risks are not left untested. Moreover, because the testing is targeted to input points of accessible internal modules, greater efficiencies in the testing process are realized.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory having computer readable instructions; and
a processor executing the computer readable instructions, the computer readable instructions including:
receiving application code and instrumenting the application code by inserting instrumentation hooks at internal module input points, external module input points and external module release points of the application code, wherein the instrumentation hooks are value loggers configured to:
insert a value logger into a module at a point of execution of the module, wherein inserting the value logger instruments release points and input points of both of the input modules and the output modules;
mapping data flow between the external module release points and the internal module input points of the application code via the instrumentation hooks;
determining at least one of the internal module input points is accessible via at least one of the external module release points;
determining a constraint by calculating the difference between the recorded values at the external module release point and external module input point of the respective external module;
and
testing the accessible internal module input point associated with the respective external module release point by sending a test value based on the constraint associated with the external module release point to the accessible internal module input point, wherein testing comprises sending test values that test for a data leakage, the test values based on a plurality of constraints from a plurality of external modules.

2. The system of claim 1, wherein the internal module input points and the external module release points comprise inter-process communication (IPC) points.

3. The system of claim 1, wherein the instrumentation hooks comprise a plurality of value loggers.

4. The system of claim 1, wherein the computer readable instructions include dynamically analyzing the application code by mapping the data flow after executing the instrumented application code and recording values at the instrumentation hooks.

5. The system of claim 1, wherein the computer readable instructions include determining whether an internal module input point is accessible via the external module release points by matching a value recorded by the instrumentation hook at the internal module input point and a value recorded by the instrumentation hook at an associated external module release point.

6. The system of claim 1, the computer readable instructions include identifying a vulnerable internal module input point based on the test.

7. A method, comprising:
applying, via a processor, instrumentation hooks to internal module interface points and external module interface points of application code, said external module interface points including an external module release point and an external module input point, wherein the instrumentation hooks are value loggers configured to:
insert a value logger into a module at a point of execution of the module, wherein inserting the value logger instruments release points and input points of both of the input modules and the output modules;
executing, via the processor, the application code and recording values received at the instrumented interface points;
determining, via the processor, at least one of the internal module input points is accessible via at least one of the external module release points and determining a constraint associated with an external module interface point by calculating the difference between the recorded values at the external module release point and external module input point of a respective external module; and
testing, via the processor, the accessible internal module input point associated with the external module interface point based on the constraint associated with the external module interface point, wherein testing comprises sending test values that test for a data leakage, the test values based on a plurality of constraints from a plurality of external modules.

8. The method of claim 7, wherein the application code is analyzed dynamically.

9. The method of claim 7, wherein applying the instrumentation hooks to internal module interface points and external module interface points is performed during analysis of the application code.

10. The method of claim 9, wherein the analysis and applying of instrumentation hooks to the application code is automated by inserting the instrumentation hooks into the application code after receiving the application code.

11. The method of claim 7, further comprising identifying, via the processor, a vulnerable internal input point of the application code.

12. The method of claim 7, wherein applying instrumentation hooks to the internal module interface points comprises inserting value loggers at the internal module input points.

13. The method of claim 7, wherein applying instrumentation hooks to the external module interface points comprises applying instrumentation hooks at external module input points and external module release points.

14. A computer program product for testing an application, the computer program product comprising a computer-readable storage medium having program code embodied therewith, wherein the computer readable storage medium is not a transitory signal per se, the program code executable by a processor to cause the processor to:
 apply instrumentation hooks to an application code at internal module input points, external module input points, and external module release points, wherein the instrumentation hooks are value loggers configured to:
  insert a value logger into a module at a point of execution of the module, wherein inserting the value logger instruments release points and input points of both of the input modules and the output modules;
 execute the application and record values received at the instrumented points;
 determine an accessible internal module input point;
 determine a constraint by calculating the difference between the recorded values at the external module release point and external module input point of a respective external module; and
 test the accessible internal module input point associated with the respective external module release point by sending a test value based on the constraint associated with the external module release point to the accessible internal module input point, wherein testing comprises sending test values that test for a data leakage, the test values based on a plurality of constraints from a plurality of external modules.

15. The computer program product of claim 14, further comprising program code executable by the processor to cause the processor to automatically instrument the application code by inserting instrumentation hooks into the application code.

16. The computer program product of claim 14, further comprising program code executable by the processor to cause the processor to map an external module release point to an internal module input point.

17. The computer program product of claim 14, further comprising program code executable by the processor to cause the processor to test the accessible internal input point by sending the accessible internal input point a value based on the constraint.

18. The computer program product of claim 17, further comprising program code executable by the processor to cause the processor to identify a vulnerable internal entry point of business logic.

* * * * *